US012586038B2

(12) United States Patent
Yang et al.

(10) Patent No.: US 12,586,038 B2
(45) Date of Patent: Mar. 24, 2026

(54) INTELLIGENT SYSTEM AND METHOD OF OPTIMIZING CROSS-TEAM INFORMATION FLOW

(71) Applicant: Microsoft Technology Licensing, LLC, Redmond, WA (US)

(72) Inventors: Longqi Yang, Issaquah, WA (US); Mengting Wan, Bellevue, WA (US); Cao Lu, Bellevue, WA (US); Jennifer Lynay Neville, West Lafayette, IN (US); Kiran Tomlinson, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 18/304,296

(22) Filed: Apr. 20, 2023

(65) Prior Publication Data

US 2024/0354703 A1     Oct. 24, 2024

(51) Int. Cl.
*G06Q 10/10* (2023.01)
*G06F 16/901* (2019.01)
(Continued)

(52) U.S. Cl.
CPC ....... *G06Q 10/101* (2013.01); *G06F 16/9024* (2019.01)

(58) Field of Classification Search
CPC .......................... G06Q 10/101; G06F 16/9024
(Continued)

(56) References Cited

U.S. PATENT DOCUMENTS 9,984,126 B2 *   5/2018   Hoagland ........... G06F 16/9535
11,184,301 B2 *  11/2021  Menon ..................... G06N 3/08
                     (Continued)

FOREIGN PATENT DOCUMENTS

CN          1716525 A      1/2006
WO       2008074347 A2     6/2008

OTHER PUBLICATIONS

"Flowtrace Collaboration flow", Retrieved From: https://www.flowtrace.co/solution-collaboration-flow, Retrieved on: Feb. 20, 2023, 12 Pages.
(Continued)

*Primary Examiner* — Jonathan P Ouellette
(74) *Attorney, Agent, or Firm* — Han Gim; Newport IP, LLC

(57) ABSTRACT

A system and method and for optimizing cross-team information flow in a communication network includes receiving, from a communication application, via a network, a plurality of candidate post items for display to a first user of an organization, each candidate post item being a post item published by another user of the organization and being a post that is accessible to the first user. A communication knowledge network graph which represents communication events that have occurred between users of the organization is then generated where each communication event is represented by a first node that represents a sender, a second node that represents a receiver and an edge that represents the communication event from the sender to the receiver. For each one of the candidate post items, a value of a total information metric for the communication knowledge network is estimated if one of the plurality of candidate posts is viewed by the first user and the plurality of candidate post items are ranked based on the estimated total information metric before transmitting recommendation data to the com-
(Continued)

RECOMMENDATION SYSTEM
142

COMMUNICATION
EVENT
210

POST
212

TEAM INFORMATION
214

KNOWLEDGE NETWORK
GENERATING ENGINE
216

COMMUNICATION
KNOWLEDGE
NETWORK
218

RECOMMENDATION
ENGINE
220

LATENCY
MEASURING UNIT
222

TOTAL
INFORMATION
MEASURING UNIT
224

RECOMMENDATION
OUTPUT
226 munication application for recommending the plurality of candidate posts to the user based on the ranking.

19 Claims, 7 Drawing Sheets

(51) Int. Cl.

| | |
|---|---|
| *G06Q 10/101* | (2023.01) |
| *G06Q 30/04* | (2012.01) |
| *G06Q 30/0601* | (2023.01) |

(58) Field of Classification Search
USPC .................................................. 705/1.1, 300
See application file for complete search history.

(56) References Cited

U.S. PATENT DOCUMENTS

| | | | | |
|---|---|---|---|---|
| 11,232,383 | B1 | 1/2022 | Burns et al. | |
| 11,444,896 | B1 | 9/2022 | Kwon et al. | |
| 2006/0168036 | A1* | 7/2006 | Schulz ................. | G06Q 10/107 709/206 |
| 2007/0265864 | A1 | 11/2007 | Chess et al. | |
| 2010/0082695 | A1* | 4/2010 | Hardt .................... | G06F 16/972 707/E17.108 |
| 2012/0290637 | A1* | 11/2012 | Perantatos ............. | G06Q 10/10 709/203 |
| 2013/0275429 | A1* | 10/2013 | York ..................... | G06F 16/435 707/E17.002 |
| 2015/0100509 | A1 | 4/2015 | Ericsson et al. | |
| 2016/0267497 | A1 | 9/2016 | Li et al. | |
| 2016/0321583 | A1 | 11/2016 | Jones et al. | |
| 2018/0189377 | A1 | 7/2018 | Barnea et al. | |
| 2021/0319402 | A1 | 10/2021 | Ramaswamy et al. | |
| 2022/0351142 | A1* | 11/2022 | McGarr ................ | H04L 51/216 |
| 2023/0205833 | A1* | 6/2023 | Saha ........................ | G06F 16/93 715/711 |
| 2023/0334232 | A1* | 10/2023 | Zotto ..................... | G06N 5/022 |
| 2024/0212005 | A1* | 6/2024 | De Gour ................ | G06Q 50/01 |

OTHER PUBLICATIONS

Alhijawi, et al., "Survey on the Objectives of Recommender Systems: Measures, Solutions, Evaluation Methodology, and New Perspectives", In Journal ACM Computing Surveys, vol. 55, Issue 5, Dec. 3, 2022, 38 Pages.

Ali, et al., "Improving Team Innovation Performance: Role of Social Media and Team Knowledge Management Capabilities", In Journal of Technology in Society, vol. 61, May 1, 2020, 12 Pages.

Amelkin, et al., "Fighting Opinion Control in Social Networks via Link Recommendation", In Proceedings of 25th ACM SIGKDD International Conference on Knowledge Discovery & Data Mining, Aug. 4, 2019, pp. 677-685.

Breithaupt, et al., "Fact vs. Affect in the Telephone Game: All Levels of Surprise Are Retold With High Accuracy, Even Independently of Facts", In Journal of Frontiers in Psychology, vol. 9, Nov. 20, 2018, 15 Pages.

Carlson, Taylorn. , "Modeling Political Information Transmission as a Game of Telephone", In The Journal of Politics, vol. 80, Issue 1, Jan. 2018, pp. 348-352.

Cheng, et al., "Wide & Deep Learning for Recommender Systems", In Proceedings of the 1st Workshop on Deep Learning for Recommender Systems, Sep. 15, 2016, 4 Pages.

Craswell, et al., "An Experimental Comparison of Click Position-Bias Models", In Proceedings of the International Conference on Web Search and Data Mining, Feb. 11, 2008, pp. 87-94.

Crescenzi, et al., "Finding Top-k Nodes for Temporal Closeness in Large Temporal Graphs", In Journal of Algorithms , vol. 13, Issue 9, Aug. 29, 2020, 27 Pages.

Cruzado, et al., "Enhancing Structural Diversity in Social Networks by Recommending Weak Ties", In Proceedings of the 12th ACM Conference on Recommender Systems, Sep. 27, 2018, pp. 233-241.

Demaine, et al., "Minimizing the Diameter of a Network Using Shortcut Edges", In Proceedings of Scandinavian Workshop on Algorithm Theory, Jun. 21, 2010, 12 Pages.

Florescu, et al., "Resilient Backpropagation (Rprop) for Batch-learning in Tensor Flow", In Proceedings of the CLR, Feb. 12, 2018, 5 Pages.

Garimella, et al., "Reducing Controversy by Connecting Opposing Views", In Proceedings of the Tenth ACM International Conference on Web Search and Data Mining, Feb. 6, 2017, pp. 81-90.

Geng, et al., "Knowledge Recommendation for Workplace Learning: a System Design and Evaluation perspective", In Journal of Internet Research, vol. 30, Issue 1, Oct. 25, 2019, pp. 243-261.

Glance, et al., "Making Recommender Systems Work for Organizations", In Proceedings of PAAM, Apr. 19, 1999, 20 Pages.

Gorishniy, et al., "Revisiting Deep Learning Models for Tabular Data", In Proceedings of Advances in Neural Information Processing Systems, Dec. 2021, 12 Pages.

Granovetter, Marks., "The Strength of Weak Ties", In American Journal of Sociology, vol. 78, Issue 6, May 1, 1973, pp. 1360-1380.

Grindrod, et al., "Communicability Across Evolving Networks", In Journal of Physical Review E, vol. 83, Issue 4, Apr. 25, 2011, 10 Pages.

Haddadan, et al., "RepbubLik: Reducing Polarized Bubble Radius with Link Insertions", In Proceedings of the 14th ACM International Conference on Web Search and Data Mining, Mar. 8, 2021, pp. 139-147.

Hemmler, et al., "A Categorization of Workplace Learning Goals for Multi-Stakeholder Recommender Systems: a Systematic Review", In Journal of Tech Trends, vol. 67, Sep. 15, 2022, pp. 98-111.

Jin, et al., "Graph Coarsening with Preserved Spectral Properties", In Proceedings of the Twenty Third International Conference on Artificial Intelligence and Statistics, Jun. 3, 2020, 10 Pages.

Kalantidis, et al., "Hard Negative Mixing for Contrastive Learning", In Proceedings of Advances in Neural Information Processing Systems, Dec. 6, 2020, 12 Pages.

Ke, et al., "LightGBM: a Highly Efficient Gradient Boosting Decision Tree", In Proceedings of Advances in Neural Information Processing Systems, Dec. 4, 2017, 9 Pages.

Kempe, et al., "Connectivity and Inference Problems for Temporal Networks", In Proceedings of the Thirty-Second Annual ACM Symposium on Theory of Computing, May 1, 2000, pp. 504-513.

Konstan, et al., "RecWork: Workshop on Recommender Systems for the Future of Work", In Proceedings of the 16th ACM Conference on Recommender Systems, Sep. 13, 2022, pp. 675-677.

Kossinets, et al., "The structure of Information Pathways in a Social Communication Network", In Proceedings of the 14th ACM SIGKDD international conference on Knowledge discovery and data mining, Aug. 24, 2008, pp. 435-443.

Lamport, Leslie, "Time, Clocks, and the Ordering of Events in a Distributed System", In Journal of Communications of the ACM, vol. 21, Issue 7, Jul. 1, 1978, pp. 558-565.

Liu, et al., "Graph Summarization Methods and Applications: a Survey", In Journal of ACM Computing Surveys, vol. 51, Issue 3, Jun. 22, 2018, 34 Pages.

Mattern, Friedemann, "Virtual Time and Global States of Distributed Systems", In the Proceedings of the International Workshop on Parallel and Distributed Algorithms, Oct. 1989, pp. 120-135.

Meyerson, et al., "Minimizing Average Shortest Path Distances via Shortcut Edge Addition", In Proceedings of International Workshop on Randomization and Approximation Techniques in Computer Science, Aug. 21, 2009, 14 Pages.

Mitra, et al., "Ranking by Weighted Sum", In Journal of Economic Theory, Aug. 9, 2020, pp. 511-532.

Nemhauser, et al., "An Analysis of Approximations for Maximizing Submodular Set Functions—I", In Journal of Mathematical Programming, Dec. 1978, pp. 265-294.

Nicosia, et al., "Components in Time-Varying Graphs", In Repository of arXiv:1106.2134v3, Apr. 16, 2012, 12 Pages.

Nicosia, et al., "Graph Metrics for Temporal Networks", In Journal of Temporal Networks, Jan. 1, 2013, 26 Pages.

(56)     References Cited

OTHER PUBLICATIONS

Parotsidis, et al., "Centrality-Aware Link Recommendations", In Proceedings of the Ninth ACM International Conference on Web Search and Data Mining, Feb. 8, 2016, pp. 503-512.

Paszke, et al., "PyTorch: an Imperative Style, High-Performance Deep Learning Library", In Proceedings of the 33rd International Conference on Neural Information Processing Systems, Dec. 8, 2019, pp. 8026-8037.

Qin, et al., "Are Neural Rankers still Outperformed by Gradient Boosted Decision Trees?", In Proceedings of International Conference on Learning Representations, May 3, 2021, 16 Pages.

Rapoport, Anatol, "Spread of Information Through a Population with Socio-Structural Bias: I. Assumption of Transitivity", In Journal of The bulletin of mathematical biophysics, vol. 15, Dec. 1953, pp. 523-533.

Riedmiller, et al., "A Direct Adaptive Method for Faster Back propagation Learning: The RPROP Algorithm", In Proceedings of International Conference on Neural Networks, Mar. 28, 1993, pp. 586-591.

Robinson, et al., "Contrastive Learning With Hard Negative Samples", In Proceedings of International Conference on Learning Representations, Jan. 2021, 29 Pages.

Romero, et al., "The Directed Closure Process in Hybrid Social-Information Networks, with an Analysis of Link Formation on Twitter", In Proceedings of the International AAAI Conference on Web and Social Media, May 16, 2010, pp. 138-145.

Santoro, et al., "Time-Varying Graphs and Social Network Analysis: Temporal Indicators and Metrics", In Repository of arXiv:1102.0629v1, Feb. 3, 2011, 6 Pages.

Smith, et al., "Challenges and Barriers in Virtual Teams: a Literature Review", In Publication of SN Applied Sciences, May 20, 2020, 33 Pages.

Song, et al., "Impact of the Usage of Social Media in the Workplace on Team and Employee Performance", In Journal of Information & Management, vol. 56, Issue 8, Dec. 2019, 67 Pages.

Stich, et al., "Electronic Communication in the Workplace: Boon or Bane?", In Journal of Organizational Effectiveness: People and Performance, vol. 5, Issue 1, Mar. 2018, 10 Pages.

Tang, et al., "Temporal Distance Metrics for Social Network Analysis", In Proceedings of the 2nd ACM workshop on Online social networks, Aug. 17, 2009, pp. 31-36.

Tian, et al., "A Music Recommendation System Based on logistic regression and Extreme Gradient Boosting", In Proceedings of International Joint Conference on Neural Networks, Jul. 14, 2019, 6 Pages.

Tommasel, et al., "I Want to Break Free! Recommending Friends from Outside the Echo Chamber", In Proceedings of the 15th ACM Conference on Recommender Systems, Sep. 13, 2021, pp. 23-33.

Tsioutsiouliklis, et al., "Link Recommendations for PageRank Fairness", In Proceedings of the ACM Web Conference, Apr. 25, 2022, pp. 3541-3551.

Turner, et al., "Exploring the Workplace Communication Ecology", In Proceedings of the SIGCHI Conference on Human Factors in Computing Systems, Apr. 10, 2010, pp. 841-850.

Zhu, et al., "Minimizing Polarization and Disagreement in Social Networks via Link Recommendation", In Proceedings of Advances in Neural Information Processing Systems 35, Dec. 6, 2021, 13 Pages.

Voorhees, Ellenm. , "The TREC-8 Question Answering Track Report", In Journal of Trec, vol. 99,, Nov. 16, 1999, 6 Pages.

Wu, et al., "Path Problems in Temporal Graphs", In Journal of the VLDB Endowment, vol. 7, Issue 9, May 1, 2014, pp. 721-732.

Yang, et al., "The Effects of Remote Work on Collaboration Among Information Workers", In Journal of Nature human behaviour, vol. 6, Issue 1, Jan. 2022, pp. 43-54.

Yu, et al., "Friend Recommendation with Content Spread Enhancement in Social Networks", In Journal of Information Sciences, vol. 309, Jul. 10, 2015, pp. 102-118.

Zangerle, et al., "Evaluating Recommender Systems: Survey and Framework", In Journal of ACM Computing Surveys, vol. 55, Issue 8, Dec. 23, 2022, 38 Pages.

Zheng, et al., "A Survey of Recommender Systems with Multi-Objective Optimization", In Journal of Neurocomputing, vol. 474, Feb. 14, 2022, pp. 141-153.

Zhou, et al., "Maximizing Influence of Leaders in Social Networks", In Proceedings of the 27th ACM SIGKDD Conference on Knowledge Discovery & Data Mining, Aug. 14, 2021, pp. 2400-2408.

* cited by examiner 300A
310
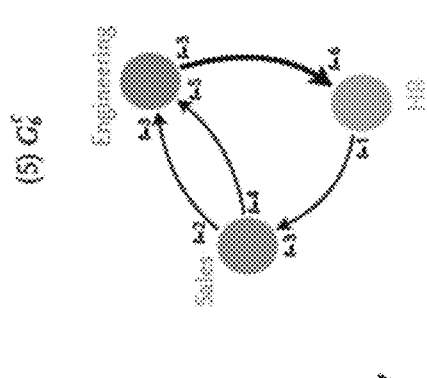
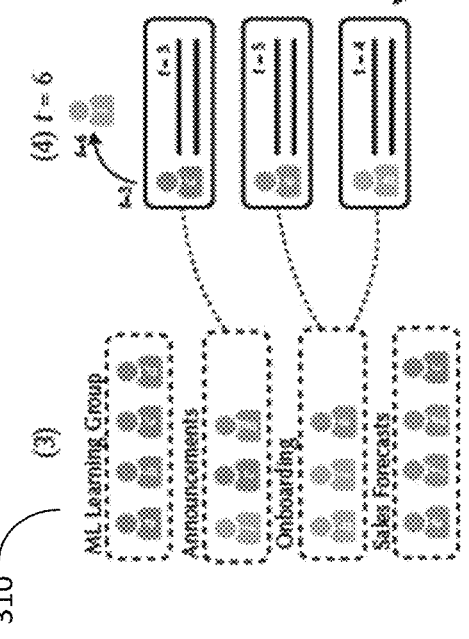
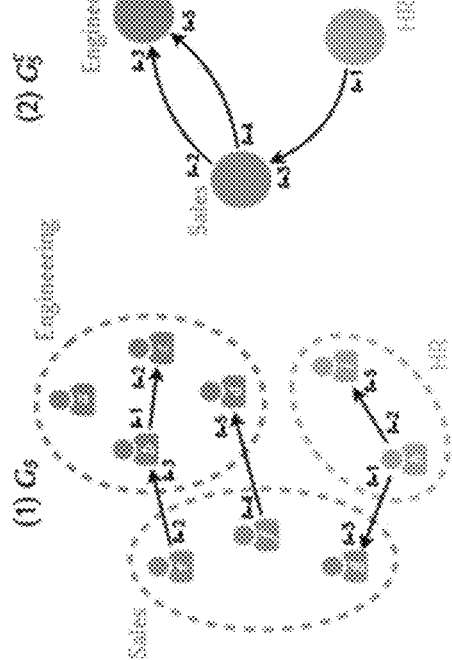
FIG. 3

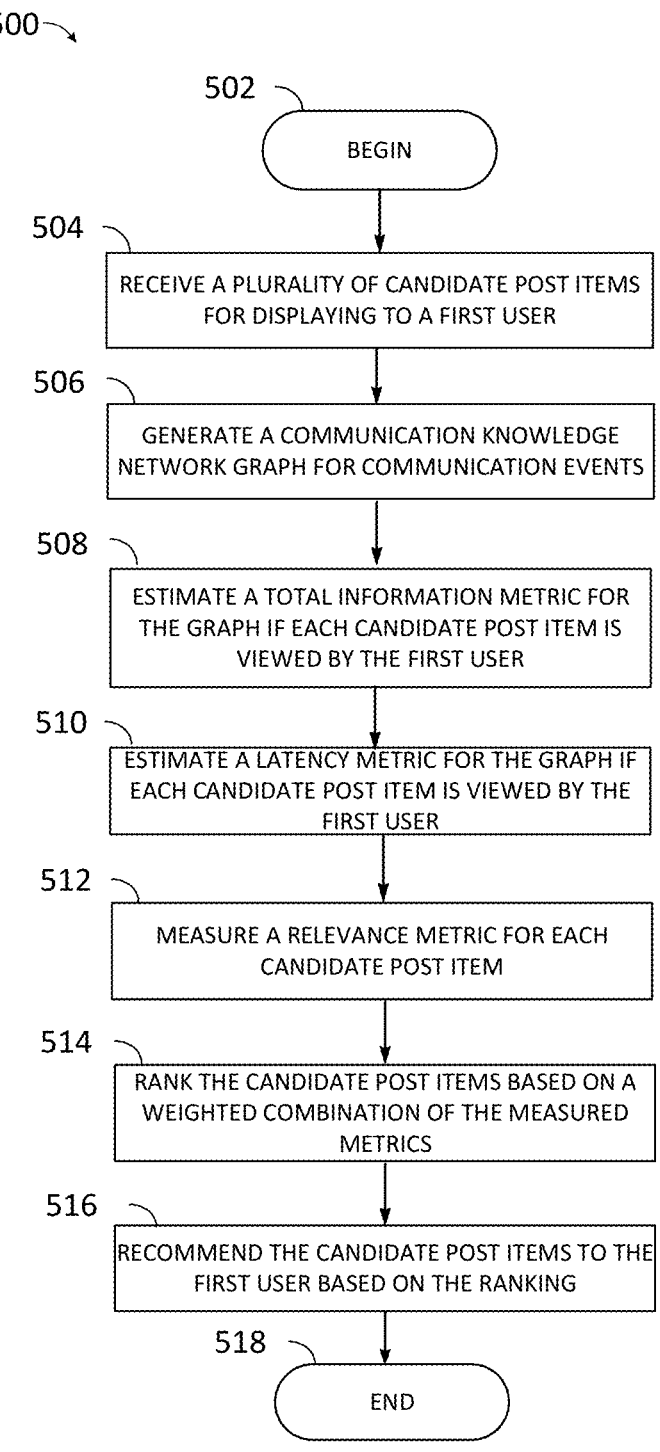

500

502

BEGIN

504

RECEIVE A PLURALITY OF CANDIDATE POST ITEMS FOR DISPLAYING TO A FIRST USER

506

GENERATE A COMMUNICATION KNOWLEDGE NETWORK GRAPH FOR COMMUNICATION EVENTS

508

ESTIMATE A TOTAL INFORMATION METRIC FOR THE GRAPH IF EACH CANDIDATE POST ITEM IS VIEWED BY THE FIRST USER

510

ESTIMATE A LATENCY METRIC FOR THE GRAPH IF EACH CANDIDATE POST ITEM IS VIEWED BY THE FIRST USER

512

MEASURE A RELEVANCE METRIC FOR EACH CANDIDATE POST ITEM

514

RANK THE CANDIDATE POST ITEMS BASED ON A WEIGHTED COMBINATION OF THE MEASURED METRICS

516

RECOMMEND THE CANDIDATE POST ITEMS TO THE FIRST USER BASED ON THE RANKING

518

END

INTELLIGENT SYSTEM AND METHOD OF OPTIMIZING CROSS-TEAM INFORMATION FLOW

BACKGROUND

In recent years, social communication programs such as Microsoft Teams have become an important aspect of communication, enabling remote collaboration and knowledge transfer between workers, classmates, friends and family. These platforms have become even more important with the increase in remote work in recent years. While such communication programs are very useful for enabling communication and transfer of knowledge between individuals, the large quantity of electronic communications generated and/ or exchanged by the available communication programs can become overwhelming for users. This is particularly true for organizations that use multiple different communication programs to communicate (e.g., email, instant messaging, social media applications, and the like).

In order to manage information overload for users, some applications utilize recommendation systems that help users filter out irrelevant content. In the context of workplace communication programs, recommendations systems provide an opportunity to not only help users find relevant information, but also to shape the structure of an organization's communication network. For example, by bringing information from different parts of an organization to a user's attention, the recommendation system can help ideas and resources spread more quickly and efficiently. Traditionally, recommendation systems provide recommendations based on relevance. This means that recommendations are made for items of information that are identified as being relevant to a user. Relevance is often determined on a user-by-user basis. While this provides an avenue for recommending content that is relevant to a user, it does not promote communication flow within an organization.

Hence, there is a need for improved systems and methods of optimizing cross-team information flow.

SUMMARY

In one general aspect, the instant disclosure presents a data processing system having a processor and a memory in communication with the processor wherein the memory stores executable instructions that, when executed by the processor, cause the data processing system to perform multiple functions. The functions include receiving, from a communication application, via a network, a plurality of candidate post items for display to a first user of an organization, each candidate post item being a post item published by a second user of the organization and being a post available for viewing by the first user. The functions also include accessing a communication knowledge network graph which represents communication events that have occurred between users of the organization, each communication event having a sender and a receiver. Using a latency measuring unit, an information latency metric that accounts for an age of information in the communication knowledge network graph is measured. Moreover, using a total information measuring unit, a total information metric for the communication knowledge network graph is measured. Furthermore, using a recommendation engine, changes in at least one of the information latency metric or the total information metric if one of the candidate post items is recommended for viewing to the first user are estimated. Based on the changes, it is determined that the one of the candidate post items should be recommended to the first user for viewing to optimize information flow between the users of the organization; and recommendation data is transmitted to the communication application, via the network, for recommending the one of the candidate post items to the user for viewing.

In yet another general aspect, the instant disclosure presents a method for optimizing cross-team information flow in a communication network. In some implementations, the method includes receiving, from a communication application, via a network, a plurality of candidate post items for display to a first user of an organization, each candidate post item being a post item published by another user of the organization and being a post that is accessible to the first user. A communication knowledge network graph which represents communication events that have occurred between users of the organization is then generated where each communication event is represented by a first node that represents a sender, a second node that represents a receiver and an edge that represents the communication event from the sender to the receiver. For each one of the candidate post items, a value of a total information metric for the communication knowledge network is estimated if one of the plurality of candidate posts is viewed by the first user and the plurality of candidate post items are ranked based on the estimated total information metric before transmitting recommendation data to the communication application for recommending the plurality of candidate posts to the user based on the ranking.

In a further general aspect, the instant application describes a non-transitory computer readable medium on which are stored instructions that when executed cause a programmable device to perform functions of receiving, from a communication application, via a network, a plurality of candidate post items for display to a first user of an organization, each candidate post item being a post item published by another user of the organization and being a post that is accessible to the first user, the organization having a plurality of teams and the first user belonging to a first team of the plurality of teams and the other user belonging to a second team of the plurality of teams; generating, via a knowledge network generating engine, a communication knowledge network graph which represents communication events that have occurred between the plurality of the teams, each communication event being represented by a first node that represents a sending team of the communication event, a second node that represents a receiving team of the communication event and an edge that represents the communication event from the sending team to the receiving team; for each one of the plurality of candidate post items, estimating, using a total information measuring unit, a value for a total information metric for the communication knowledge network if one of the plurality of candidate post items is viewed by the first user; ranking the plurality of candidate post items based on the estimated total information metric for each of the plurality of candidate post items to optimize cross-team information flow in the organization; and transmitting recommendation data to the communication application, via the network, for recommending the plurality of candidate post items to the user based on the ranking.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 depicts an example of using a recommendation system to generate a recommendation.

FIG. 5 is a flow diagram depicting an example method for optimizing cross-team information flow in an organization.

DETAILED DESCRIPTION

Figure 1:
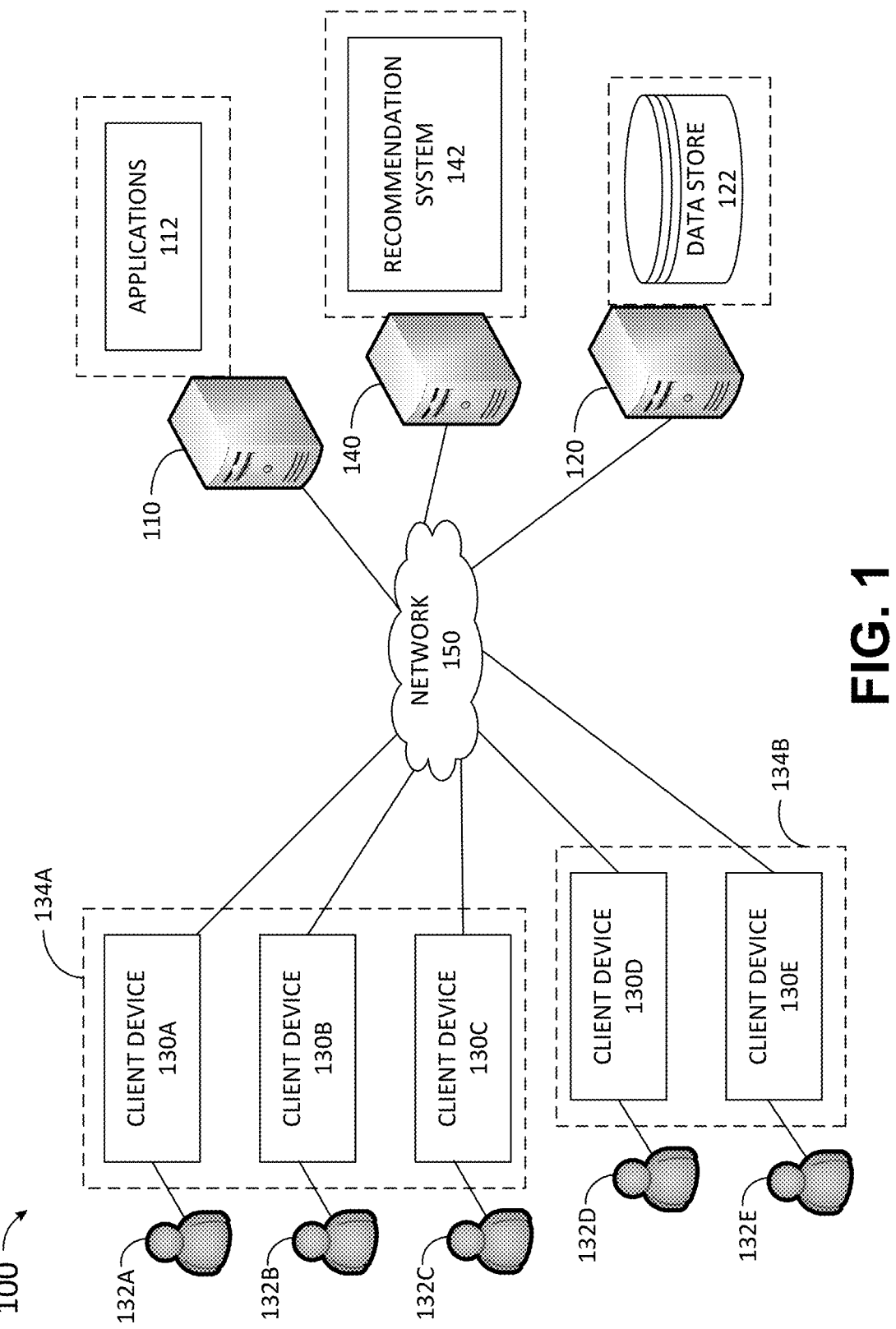
FIG. 1 depicts an example system upon which aspects of this disclosure may be implemented.

As noted above, in today's fast paced environment, users communicate with a number of other users on a daily basis using a variety of communication platforms. Additionally, users interact with social communication applications that present various posts for the users viewing. The posts may be made by other users or maybe a communication between two or more users. With the quantity of communications and posts available to users on a daily basis, the users often feel overwhelmed and/or may not know which communications and/or posts to pay attention to. In order to reduce user overload, some communication platforms utilize recommen-dation systems that identify communications/posts that may be relevant to each particular user. These systems often use relevance metrics that focus on whether a communication or post is relevant to the user. While this is helpful in identi-fying communications/posts that are relevant to particular users, the currently available recommendation systems do not take into account cross-team communications between different teams in an organization. As such, current recom-mendation systems cannot improve cross-team information flow. Furthermore, current recommendation systems do not take into account temporal flow of information. Taking cross-team information flow and temporal aspects of com-munications into consideration, when identifying recom-mendations, however, is a challenging undertaking, in par-ticular in organizations with many users and a variety of teams and in which users utilize a variety of communication platforms to communicate. Thus, there exist a technical problem of lack of mechanisms for recommending posts in an organizational setting that optimize cross team commu-nications by taking cross-team information flow and tem-poral aspects of communications into consideration. As a result, the users are offered recommendations that are obso-lete, do not advance communication across teams and/or do not optimize productivity.

To address these technical problems and more, in an example, this description provides technical solutions for optimizing cross-team information flow by recommending posts in an organization's communication network that would create new opportunities for enhancing communica-tions across teams. This is achieved by utilizing an algorithm that measures temporal information flow through an infor-mation latency metric and accounts for the age of the information and a total information metric that takes into account degradation of information along the network and the quantity of communication. The measured results are used by a recommendation engine to recommend posts to users that optimize cross-team network.

In some implementations, the technical solution treats multi-platform organization (e.g., workplace) communica-tion as a temporal knowledge network and considers how recommendations on one communication platform can increase global information flow. This improves the efficient spread of information between teams in an organization, since within-team communication is likely to already be strong. In some implementations, the communications/posts examined are post-based conversations exchanged in com-munication applications in which users create and post content within channels, which are usually centered around a topic, team, or project. In some such applications, posts in a channel are only visible to the channel's members, who can interact with the post (e.g., reply). When a user belongs to many different channels, some of which expands across multiple teams, it is not easy to review every post in each channel. As a result, users may miss important posts, in particular, posts that optimize cross-team information flow. The technical solutions provided in this disclosure address this technical problem by recommending posts from chan-nels a user belongs to in a way that increases the speed and quantity of cross-team information flow, without increasing the communication burden on the user. This is achieved by efficiently taking advantage of indirect communication. For example, if A posts a message directed to B about an issue, B can then relay the message to C. The algorithm takes into consideration the possibility of flow of information in this manner in making recommendations. Additionally, it is important that recommended posts still be relevant to users, or they might become dissatisfied with the system's recom-mendations. As such, the algorithms used in this disclosure optimize both traditional relevance metrics and network information flow. Furthermore, the algorithm takes into account the temporal nature of communications. That means that it matters when communication takes place as well as who participates in the communications. Referring back to the earlier example, if B reviews and replies to an email from A and then later replies to a post written by C. B's reply to C can draw on information learned from A. However, B's reply to A cannot rely on information learned later from C's post. This type of information flow it taken into account, when making recommendations. As such, the recommenda-tion algorithm disclosed herein optimizes two temporal network objectives that capture the speed and quantity of information flow. These temporal network objectives are information latency and total information. Furthermore, the algorithm identifies the edges in the knowledge network that most improve these measures.

Estimating the impact of a recommendation system on a communication network is a particularly challenging endeavor. A previously utilized approach is to conduct an organization-level test, where different organizations use different recommendation systems during a test period, and the impact of the recommendation systems on their communication patterns is measured separately and then compared. However, this is a costly and time-consuming task and is in many ways impractical to real-world scenarios. Other previous recommendation systems with static networks have used offline evaluation. However, previous offline evaluation systems are ill-suited to temporal recommendations. In the temporal setting, the recommendations users have taken in the past influence the structure of the communication network, which future recommendations need to account for. Thus, there exists another technical problem of lack of efficient mechanisms to evaluate the impact of a recommendation system having temporal objects.

To address this technical problem, this description provides technical solutions by providing an offline evaluation pipeline for recommendations with temporal network objectives. This is achieved by utilizing a simple and tunable user modeling approach to understand a range of possible outcomes of the recommendation algorithms. Using the offline evaluation pipeline, the effectiveness of the recommendation algorithm on a rich dataset of one month of communication between a large number of (e.g., over 100,000) employees at an organization was evaluated. Our data included communications across multiple communication applications such as emails, posts and instant messages on a communications application (e.g., Microsoft Teams), and file sharing on cloud storage applications. The recommendation systems provided herein was shown to increase cross-team communication, enabling information to spread more efficiently though an organization.

The technical solution described herein addresses the technical problem of the inability of current mechanisms to provide recommendations that optimize cross-team information flow and take into account temporal flow of information such that recommendations are likely to be made for posts that are new to the user (i.e., the user has not previously been exposed to that post or information). The technical solution provides recommendations that are relevant to users, increase cross-team communications, and increase overall knowledge within the organization. The technical effects include at least (1) improving the efficiency of communicating across teams in an organization; (2) improving the quality and likelihood of useful of recommendations to users in an organization setting; and (3) improving user satisfaction in reducing the number of posts/communications they have to review to on a daily basis to stay informed.

FIG. 1 illustrates an example system 100, upon which aspects of this disclosure may be implemented. The system 100 includes a server 110, which includes a number of applications 112, a server 140 which includes a recommendation system 142, a server 120 which includes a data store 122, and a number of client devices 130A-130E (collectively referred to as client device 130). While shown as one server, each of the servers 110, 120 and 140 may represent a plurality of servers that work together to deliver the functions and services provided by each services or applications included in the servers. The servers 110, 120 and 140 may also operate as cloud-based servers for offering application services, storage services and/or recommendation services. Each of the servers 110, 120 or 140 may also operate as a shared resource server located at an enterprise accessible by various computer client devices such as the client device 130.

The server 140 includes and/or executes a recommendation system 142, which receives and processes communication events to generate recommendations for one or more users. The recommendation system 142 receives communication events as well as posts from a variety of users such as users 132A-132E via client devices 130A-130E, respectively, generates a communication knowledge network based on the communication events and determines which posts to recommend to which users based on the communication knowledge network.

Communication events refer to any digital communication sent from a user of the system 100 to another user of the system 100. Communication events include email messages, instant messages, text messages, voice messages or any other type of message or communication sent via a device associated with system 100 from one user to another user. Each user 132A-132E in system 100 is a user associated with the organization for which the recommendation system 142 provides recommendations. For example, the users 132A-132E may be employees of the organization or students of the organization, when the organization is an educational institution.

A post refers to a message that is shared with and is available for viewing to a group of two or more users of the organization, the users being a subset of the users of the organization (e.g., a post is not available to all users of the organization). A post is shared via a communication platform (e.g., Microsoft Teams®). In some implementations, a post is shared in a communication channel of the communication platform. For example, users of the organization may have created multiple channels related to various topics, each channel having a plurality of members. The members may be preselected by the user who created the channel or may be added, as needed or desired. Members of each channel can share information with the other members of the channel by posting messages to the channel's news feed. However, because of the large number of posts submitted to each channel, the number of channels each user is a member of, and other communications the users have to monitor and keep track of, many users may not be able to view every post to every channel they are a member of. The recommendation system 142 examines a set of candidate post items that are available to a user (e.g., via the channels the user is a member of), uses the communication knowledge network it has created based on the latest communication events in the organization, and re-ranks the candidate post items in a way that simultaneously optimizes the utility of information for the user and the flow of information across teams in the organization.

The recommendation system 142 creates the communication knowledge network and generates recommendations of users in real-time. This means that as posts are generated and/or communication events occur, recent communication events and posts are transmitted to the recommendation system 142, which uses the communication events to update the communication knowledge network and generate recommendations for the latest posts for various users. The internal structure of and data flow between the various elements of the recommendation system 142 is discussed in greater detail with respect to FIG. 2.

The communication events may be transmitted from the client devices 130A-130E via one or more local applications (e.g., local email application, local instant messaging application, and the like) or via applications 112 executed on server 110. Applications 112 are cloud-based applications that are provided via an online service. In some implementations, web applications communicate via a network 150 with a user agent, such as a browser (not shown), executing on the client devices 130. The local applications and/or applications 112 may also be used to generate and submit new posts. The communication events and/or post may be stored locally on the client devices 130 and/or may be stored on a server 120. The server 120 is connected to or includes the data store 122 which functions as a repository in which databases relating to communications, communication events, and/or communication knowledge network are stored. Although shown as a single data store, data store 122 is representative of multiple storage devices and data stores which may be accessible by one or more of the client devices 130, applications 112, and recommendation system 142.

The client devices 130 are connected to the server 110 via network 150. The network 150 may be a wired or wireless network(s) or a combination of wired and wireless networks that connect one or more elements of the system 100. Each of the client devices 130A-130E may be a personal or handheld computing device having or being connected to input/output elements that enable a user 132A-132E to interact with various applications (e.g., application 112 or local applications). The users 132 and, as such, their corresponding client devices 130 may be categorized into a plurality of teams such as teams 134A and 134B. Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 6 and 7.

In some implementations, the client devices 130 are divided into teams. Teams may be identified in a variety of different manners. One approach for identifying teams is using an organization's hierarchy (e.g., reporting hierarchy of an organization). Another method is grouping users based on the projects they work on, the type of work they do, work titles, and the like. For organizations such as educational institutions, the teams may be based on the students' majors, classes they are taking, projects they are working on and the like. Teams may also be created based on communication patterns. In an example, communication clusters may be formed from observed interactions. This can be done, for example, by examining email exchanges to see who people frequently email with. Based on the frequency, the recommendation system 142 and/or another engine may identify certain users as belonging to the same team.

Figure 2:
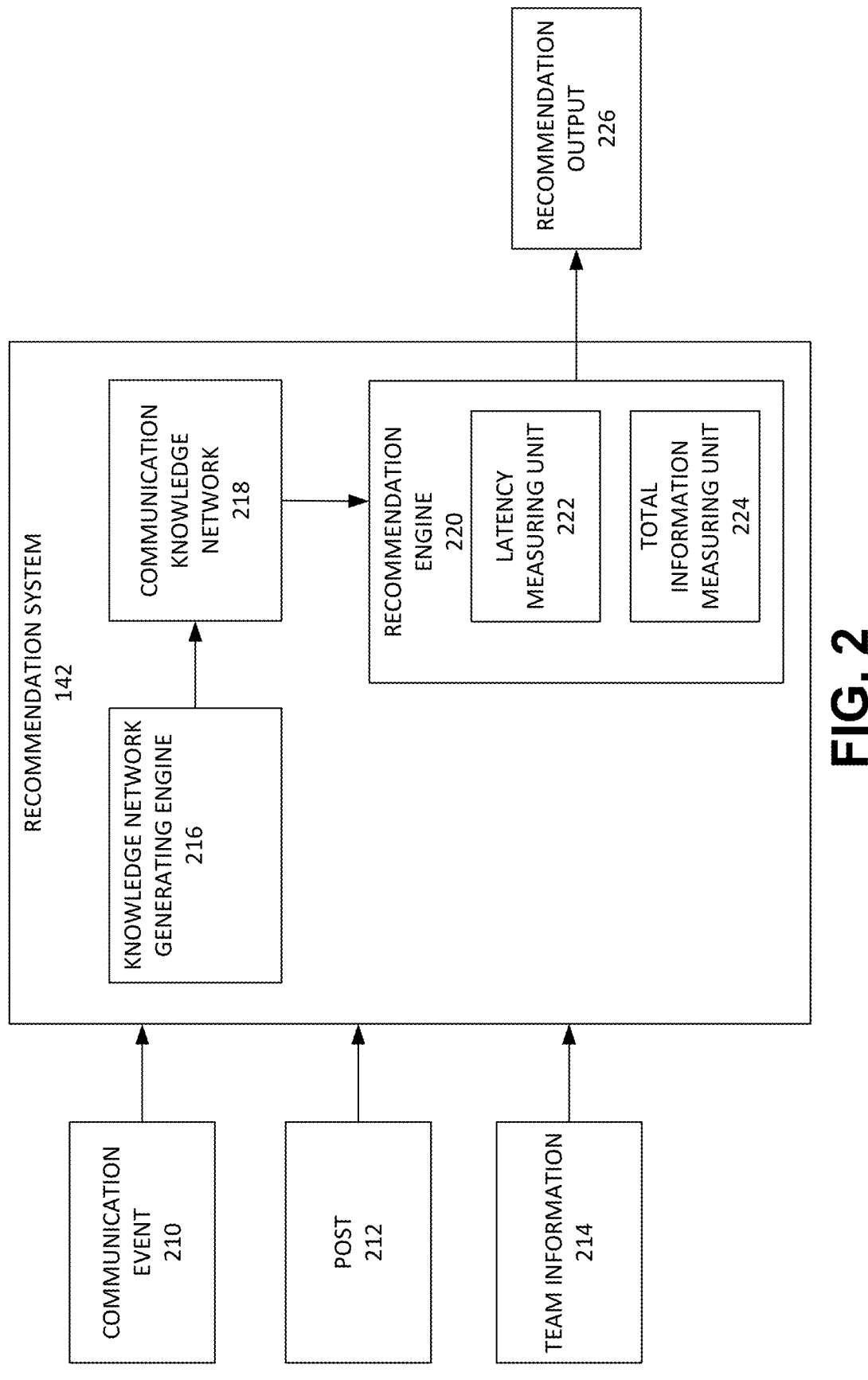
FIG. 2 depicts an example of some elements involved in optimizing cross-team information flow in an organization.

FIG. 2 depicts an example of some elements involved in optimizing cross-team information flow in an organization. Once a new communication event 210 or post 212 becomes available in an computer environment of an organization, the new communication event 210 or post is transmitted to the recommendation system 142. Alternatively and/or additionally, the recommendation system 142 may continuously access a data store of communication events 210 and posts 212 to check for new posts (e.g., communication events and posts received since the last time these data sets were checked). The recommendation system 142 provides the communication event 210 to the knowledge network generating engine 216, which utilizes the newly received communication event(s) and previous communication events to generate or update an already generated communication knowledge network 218.

The communication knowledge network 218 is a temporal knowledge graph of communication events that includes a separate node for each user in the organization. To generate the communication knowledge network 218, the knowledge network generating engine 216 models the way in which information travels across the organization using a temporal graph that keeps tracks of communication events on one or more platforms in the organization (e.g., both on a platform on which recommendations are made and other platforms on which recommendations are not made). In the communication knowledge network 218, every person is represented by a node and there is an edge from one person to another person if they exchange a communication event. For example, if person A emails person B at time X, which is read by person B at time Y, the communication knowledge network 218 will include an edge from person A to person B with the temporal information of the email being sent at time X and being read at time Y. In creating the communication knowledge network 218, the knowledge network generating engine 216 takes into account the temporal flow of information. That is because, referring back to the email example, if after reading the email, person B sends a message to person C at time Z, the message may contain some information communicated to person B by person A at time X. The flow of information in this manner should obey the flow of time. As a result, the knowledge network generating engine 216 takes the timing of communication events into account when generating the communication knowledge network 218. This accounts for temporal information flow. As a result, the communication knowledge network 218 provides information about who is communicating with whom in the organization and at what departure and arrival times.

To generate the communication knowledge network 218, a set of calculations are performed by the knowledge network generating engine 216. In an example, the communication knowledge network 218 is referred to as graph G, which consists of a set of nodes V and a set of temporal edges E, with $n=|V|$ and $m=|E|$. Nodes in graph G represent individuals in the communication network. A temporal edge is a 4-tuple (u, v, d, a), where $u \in V$ is the source, $v \in V$ the destination, d the departure time, and $a > d$ the arrival time. For example, this could represent an email sent by person u at time d, which is later read by person v at time a. In some implementations, the edges are weighted based on one or more parameters. For example, the edges may be weighted based on the type of communication application used to transmit the communication event (e.g., some communication applications may be more important in the organization), the length of the communication (e.g., longer emails are likely to contain more information), whether any attachment was included in the communication, and the like. When edges are weighted, a fifth element, w, is added to the tuple ((u, v, d, a, w).

A temporal path P of length k in the graph G refers to a sequence of distinct nodes $v_1 \ldots v_{k+1}$ traversed by edges $e_1 \ldots e_k$, where $e_i=(v_i, v_{i+1}, d_i, a_i)$ for $i=i \ldots k$ and $d_{i+1}>a_i$ for $i=1 \ldots k-1$. The departure time d(P) of a path is the departure time of its first edge, while the arrival time of a path a(P) is the arrival time of its last edge. P(u, v) denotes the set of all temporal paths from u to v in graph G. A temporal graph is strongly connected, if for each ordered pair of nodes u and v, there exists a path from u to v (i.e., P(u, v) is not empty for each pair of u and v). To generate the graph, $G_t=(V, E_t)$ may be used to denote the state of graph G at time t, where $E_t$ only includes edges with arrival times before t: $E_t=\{(u, v, d, a) \in E | a \leq t\}$. The set of paths from u to v in $G_t$ is then denoted $P_t(u, v)$.

In addition to the communication events 210 being included in the communication knowledge network 218, posts 212 may also be represented in the communication knowledge network 218. As discussed above, posts 212 refer to messages posted to a particular communication platform that enables sharing of posts in channels or other groups in which a user is a member. For example, a post p=(u, t) may be written by a user u at a time t and published in a channel. In some implementations, each channel has a set of members, which is a subset of V (nodes in the graph), and users can be members of many channels. Posts in a channel are only visible to the channel's members. If another user v reads the post p at time t', the knowledge network generating engine 216 adds an edge (u, v, t, t') to the graph G, representing the transfer of information from the author of the post to the reader. If v replies to the post at time t' and the post's author u reads the reply at t", another edge (v, u, t', t") is added to G.

In some implementations, once a first iteration of the graph is generated, further revisions are made to take into account cross-teams communication patterns. To achieve this, in some implementation, team information 214 is provided to the recommendation system 142. The team information may be based on user profile (e.g., title of the employee), organizational hierarchy and the like and is transmitted to the recommendation system to enable analysis of cross-team information flow. As discussed above, in other implementations, the recommendation system 142 or another engine may analyze the communication events in the system to cluster users into teams based on their communications. This may be achieved by utilizing artificial intelligence such as a trained cluster identification machine-learning model.

To take cross-team information flow into consideration, the knowledge network generating engine 216, may partition the nodes V into disjoint sets $S_1 \ldots S_k$, where each set represents a separate team in the organization. Given G and this partition, the graph is revised to generate the cross-cluster communication network $G^c$, which is a modified version of the graph G according to $S_1 \ldots S_k$. To form$G^c$, the multiple nodes v in each cluster Si are collapsed into one node $S_i$. Edges in G between any nodes of Si and Sj (i≠j) are then displayed as edges in $G^c$ between the si and sj, with the same departure and arrival times as the original edges. Within-cluster edges are removed. This is illustrated in FIG. 3, which depicts an example of using a recommendation system such as the recommendation system 142 to generate a knowledge graph $G_S$ during the first stage of the process. As illustrated in FIG. 3, the users in the organization are partitioned into three different teams of sales, engineering and HR. A communication event from one user to another is displayed by an arrow from one node to the other. These arrows are referred to, herein, as edges of the graph. Each arrow displays a departure time and an arrival time. Thus, in the graph $G_S$, a communication event from user h departs at t=1 and arrives at t=3, while a communication event from user h departs at t=2 and arrives at t=5. The communication event from user h to user i is within the team HR and the communication event from user h to user g is cross-teams.

Once graph $G_S$ is generated, the various nodes of each team are collapsed into one node, with the internal team edges being removed, while the cross-team edges are displayed as edges from one team to another. This generates a modified graph $G_S^C$ which simplifies the graph $G_S$, while still accounting for cross-team communications. FIG. 3 also displays example channels 310 of a communication application. As depicted, each of the channels 310 include multiple members. The members may be from a variety of different teams. For example, while all members of the ML learning group channel are from the engineering team, the announcements channel includes members from the HR, engineering and sales teams. When a new post is published by user c of the engineering team at t=3 to the announcements channel, the recommendation system examines the graph $G_S^C$, to determine which of the members of the announcement channels should receive a recommendation for the post. By examining the graph $G_S^C$, it becomes clear that no communication event has been exchanged between the HR team and the engineering team. As a result, it may be determined that a communication event from the engineering team to the HR team may improve the flow of information between the HR and engineering teams. As such, a recommendation is generated for user i to view the post by user c. When user i views the post at t=6, the graph is updated to graph a new edge is $G_6^C$ which includes an edge from engineering to the HR team.

While the simplified example of FIG. 3 is useful for illustrating the process of generating a communication knowledge network and making post recommendations, determining what recommendations to make in real world scenarios which include thousands or maybe millions of communication events is much more complex. Given the complexity of real-world communication knowledge networks, this disclosure utilizes measures to examine the knowledge graph and determine how a potential recommendation would affect the flow of information. These measures are then used to make recommendations.

Referring back to FIG. 2, recommendation engine 220 utilizes the communication knowledge network 218 to generate recommendations. This is achieved by utilizing a temporal network metric which is a function F(G) of a temporal graph and computes how effectively information is transmitted within the graph G. In an example, $R_{u,t}$ is denoted as the ranking of posts recommended to user u at time t. The candidate set of posts for $R_{u,t}$ consists of recent posts (no older than t−δ) from channels user u is a member of. To ensure user interactions with posts are taken into account, $y_{u,t}$ is set equal to 1 (i.e., $y_{u,t}$=1), when u takes an action on one of the recommended posts, otherwise $y_{u,t}$ is set equal to 0. When in response to a recommendation, the user reads a post, an author-reader edge from the author to the read is added to the graph. If the reader replies to the post, another edge is added from the reader to the author. To improve cross-team information flow, the recommendation engine 220 estimates how making a recommendation would affect the communication knowledge network. Thus, denoting $G_{R,t}^C$, as the cross-team communication network resulting from using the recommendation system up until time t', the goal would be to maximize the following equation:

$$F\left(G_{R,t'}^C\right) + \gamma \sum\nolimits_{R_{u,t}|t'<t'} y_{u,t} \qquad (1)$$

where γ controls the importance of recommending relevant posts. This takes into account currently used relevant parameters while placing posts that will improve the function F(G^c) higher in the ranking, thus encouraging users to interact with those posts and therefore influencing F(G^c).

To ensure the recommendation system 142 recommend posts that are more likely to optimize the flow of information within an organization and across teams, the recommendation engine 220 calculates two measures of temporal information flow. These measures are information latency and total information. Information latency measures the age of the most recent information a user (e.g., a node in the graph)

has about another user in the system. To ensure the degradation of information along long paths and the quantity of communication are also taken into account, a total information metric is also used to account for these factors.

The recommendation engine 220 makes use of a latency measuring unit 22 to measure the information latency for a temporal network by examining the information flow paths. The view of a communication event from u to v at time t can be denoted as view(u, v, t), where the view is the latest departure time of a path from u to v that arrives no later than t. This can be formulated as view(u, v, t)=$\max_{P \in P_t}(u,v)$ d(P). If no such path P exists, then the view can be formulated as view(u, v, t)=−∞. The information latency of a node u with respect to v at time t, denoted latency(u, v, t), is the shortest amount of time between t and the departure time of a path leaving u and arriving at v no later than t. This can be formulated as latency(u, v, t)=t−view(u, v, t). Thus, latency (u, v, t) represents the minimum age of person v's knowledge about u. That is any new information person u has between view(u, v, t) and t has not reached v through graph G. In order to track all pairwise latencies in a graph, the latencies are stored in latency matrix denoted $L_t$, where $(L_t)_{uv}$=latency(u, v, t). To measure the overall communication in graph G, the latency of G at time t can be defined as the sum of all pairwise latencies. Thus, latency($G_t$)=$\Sigma_{u,v \in V}$ latency(u, v, t). It should be noted that that latency of graph G is finite if $G_t$ is strongly connected. In order to minimize the graph latency, F($G_t$) is defined as F($G_t$)=−latency($G_t$) in the context of equation (1). Pairwise latencies for the graph are computed by the latency measuring unit 222 using an algorithm that computes pairwise latencies with separate departure and arrival times using a priority queue to store in-transit edges. The latency measuring unit 222 utilizes this algorithm to calculate the latency of graph G at any given time.

The second measure calculated by the recommendation engine 220 is the total information metric. The recommendation engine 220 utilizes the total information measuring unit 224 to calculate the total information metric for the knowledge network at a given time. The total information person v has about person u at time t represents the proportion of person u's information state that v is aware of at t, under the assumptions that nodes have all of the information about themselves and have no information about nodes they have never heard from, even indirectly, and when a node u communicates with a node v, v learns about the state of every other node u has knowledge of. To calculate the total information, a weight w∈ [0, 1] is assigned to each edge e in graph G. The weight represents how efficiently the edge transmits information, from zero transfer (w=0) to perfect transfer (w=1). Additionally, exponential decay is taken into account with a rate λ to model the decay of information over time. Let $E_t(v)$ denote the set of all incoming edges to v arriving at time t.

The total information v has about u at time t is defined as a sum of the information v already had about u at t−1 and the amount of information contained in each new edge. To take decay into account, the information in each edge is time discounted and scaled by edge weight. Moreover, total information is capped at 1 at each timestep. Letting $E_t(v)$ denote the set of all incoming edges to v arriving at time t, the total information v has about u at time is then calculated using the following equation.

$$totalInf(u, v, t) = \tag{2}$$

$$\min\left\{1, \lambda totalInf(u, v, t-1) + \sum_{(z,v,d,a,w) \in E_t(v)} w\lambda^{t-d} totalInfo(u, z, d)\right\}$$

To calculate the total information for all the nodes in the graph, it is assumed that totalInf(u, u, t)=1 and totalInf(u, v, t0)=0 for time to before the earliest departure in G and all u≠v. Moreover, total information for each pair of nodes is collected and then stored in a matrix Tit where (Tit) uv=totalInf(u, v, t). To summarize the overall information quality of a graph, the total information of every pair of nodes is summed as totalInf(Gt)=$\Sigma_{u,v \in V}$ TotalInf(u, v, t).

In this manner, the recursive structure of total information accounts for indirect information flow, while edge weights account for the decay of information over long paths. By summing over incoming edges in total information, the total information measuring unit 224 accounts for the benefit of hearing many times from someone. The use of a sum corresponds to an assumption that the information contained in different communications is non-overlapping. As with latency, the total information measuring unit 224 can measure the total information efficiently using a single pass through the edges. This may be done by sweeping through the edges in temporal order, and as such simulating the spread of information. Paralleling the recursive definition, each edge only requires a local update to total information values. Thus, the total information measuring unit 224 can keep track of in-transit edges efficiently using a priority queue. An example algorithm, referred to as Algorithm 1, used by the total information measuring unit 224 to measure total information for single-source information is provided below.

| | |
|---|---|
| 1: | Input: nodes V, temporal edges E sorted by departure time, source node x ∈ V |
| 2: | $i_x \leftarrow 1$ |
| 3: | $i_u \leftarrow 0$, for all u ≠ x |
| 4: | $t_u \leftarrow$ first departure time in E, for all u ∈ V |
| 5: | Q ←empty min-priority queue |
| 6: | while IQI > 0 or E has unprocessed edges do |
| 7: |     if IQI = 0 or the next departure time in E is before the nextarrival time in Q then |
| 8: |         (u, v, d, a,w) ←next edge in E |
| 9: |         if u ≠ x then |
| 10: |             $i_u \leftarrow i_u \lambda^{d-t_u}$ |
| 11: |         if $i_u > 0$ and v ≠ x then |
| 12: |             add (v, a, $i_u w\lambda^{a-d}$) to Q with priority a |
| 13: |         $t_u \leftarrow d$ |
| 14: |     else |
| 15: |         (v, a, i) ←next arrival in Q |
| 16: |         $i_v \leftarrow i_v \lambda^{a-t_v}$ |
| 17: |         $i_v \leftarrow \min\{i_v + i, 1\}$ |
| 18: |         $t_v \leftarrow a$ |
| 19: | $i_u \leftarrow i_u \lambda^{tmax-t_u}$ , for all u ≠ x |
| 20: | return $\{(u, i_u) \mid u \in V\}$ |

The above algorithm can be extended to all-pairs for total information in the graph. In some implementations, different edge weights are used for different types of communications. For example, email, chat, posts, and the like are given different weights. In alternative implementations, a single weight is assigned for each type of communication.

Once the temporal elements of information flow in the knowledge network graph have been computed, the recommendation engine 220 determines which posts to recommend to users to optimize cross-team information flow and user engagement. The recommendation engine achieves this by measuring relevance and cross-team information metrics and ranking posts by a weighted combination of these measurements. In some implementations, recommendation system 142 estimates how a recommendation influences information flow and assigs a measure to the recommendation according to the estimation of how it would impact information flow. This can be done by measuring how adding an extra edge to the knowledge network would impact the graph (e.g., estimating how the graph would change and the amount by which it would change). This includes estimating how much the post affects the user that reads it and as a consequence the knowledge of the team that they are a part of it. In making this estimation, an assumption may be made that information shown to one team member is disseminated to other team members.

In order to optimize the function F for a future time t', the recommendation engine 220 selects edges for recommendation that will impact both information latency and total information in the future graph. In some implementations, this is achieved by measuring the effects of the recommendation resulting in an added edge. Specifically, supposing that posts are being recommending to a user v at time t', in order to compute the cross-team information metric of a post p=(u, t), we measure how much cross-team information flow would immediately improve if recommendation resulted in v reading p or v replying to p. As discussed above, if v reads p, this would result in an added edge. The edge may be referred to as an in-edge for u, meaning that the edge travels from u to v. Thus, an in-edge (u, v, t, t') is added to G. If v replies to p, this would result in an added out-edge, which refers to an edge that is received by a user. Thus, when v replies to p, an out-edge (v, u, t', t") is added to G, where t" is the time when u will receive the reply (since t" is unknown at recommendation time, an estimate is used). To measure how much the in- or out-edges would improve cross-team information flow, the cross-cluster total information and latency matrices $TI^C$ and $L^C$ are then measured. When cross-cluster communication occurs on any communication platform that is included in the knowledge network. $TI^C$ and $L^C$ are updated according to the corresponding communication edge in the team graph $G^C$. These updates only occur when an edge arrives. As in Algorithm 1, the recommendation engine 220 keeps track of in-transit cross-cluster edges in a priority queue along with the source cluster's total information and latency values at the time of departure, which is sufficient for computing the update. In other words, an all-source version of Algorithm 1 can be executed in an online fashion on $G^C$, processing edges as they occur in the real cross-cluster communication network.

In order to estimate the potential impact on $G^C$ of recommending a post p=(u, t) to v at time t', the recommendation engine 220 measures the effects that adding the post's in- or out-edge would have on $L^C$ and $TI^C$. To quantify this effect, the total change in latency($G^C$) or totalInf($G^C$) that would result from this in- or out-edge is calculated. Therefore, four different network information measures can be determined for a post recommendation depending on whether the impact on information or latency is being evaluated and whether the effects of an in- or out-edge are being measured. These measurements metrics are referred to herein as information-in, information-out, latency-in, and latency-out metrics.

In some implementations, the recommendation engine 220 combines one or more of these four measurement metrics with a relevance score produced by a traditional recommendation system to arrive at a ranking for a post. In order to achieve this, the four measurement metrics as well as the relevance scores may be normalized to the range of 0 to 1. Given a collection of posts p to rank, the relevance scores are divided by the maximum relevance score and then the network measurement metrics are divided by the maximum network measurement metric. Based on the normalized measurement metrics and relevance scores np and rp for each post p, the ranking measurement of p can be determined as Ranking(p)=np+αrp, where α≥0 is a tunable parameter controlling the importance of relevance relative to information flow. Posts ranked by this measurement achieve the weighted objective of Equation (1). In this manner, the recommendation system 142 takes both relevance and information flow into account in recommending posts to users. The resulting ranking of posts is used to either sort the posts in the manner in which they are presented to the user or to provide a recommendation to the user of one or more posts having higher ranking scores.

The recommendation system 142 provides the recommendation output 226 as an output of the system. The recommendation output 226 may be provided to the communication platform on which posts are published. The recommendation output 226 may include the ranking scores for a number of latest posts in one or more channels of the communication platform. The recommendation output 226 may also include the sorted list of posts for one or more users in one or more channels. In some implementations, recommendation output 226 is simply notification data to notify a user of a post that the recommendation system suggests for viewing. In some implementations, in addition to the recommendation output 226, the recommendation system 142 also provides the measurement metrics and/or relevance scores for one or more posts. Furthermore, the recommendation system 142 may provide the communication knowledge network 218 as an output. The communication knowledge network 218 and/or the measurement metrics may be used in an organization analytics dashboard to display data about the status of information flow in the organization, cross-team information flow in the organization and/or how adding edges to the graph may affect information flow. Furthermore, while the above discussions focus on recommending posts, the recommendation system 142 can be used to re-rank different types of communication events and/or files. For example, the recommendation system 142 can be used to re-rank group instant messages, group text message, emails, and/or files in a file sharing system.

Figure 4:
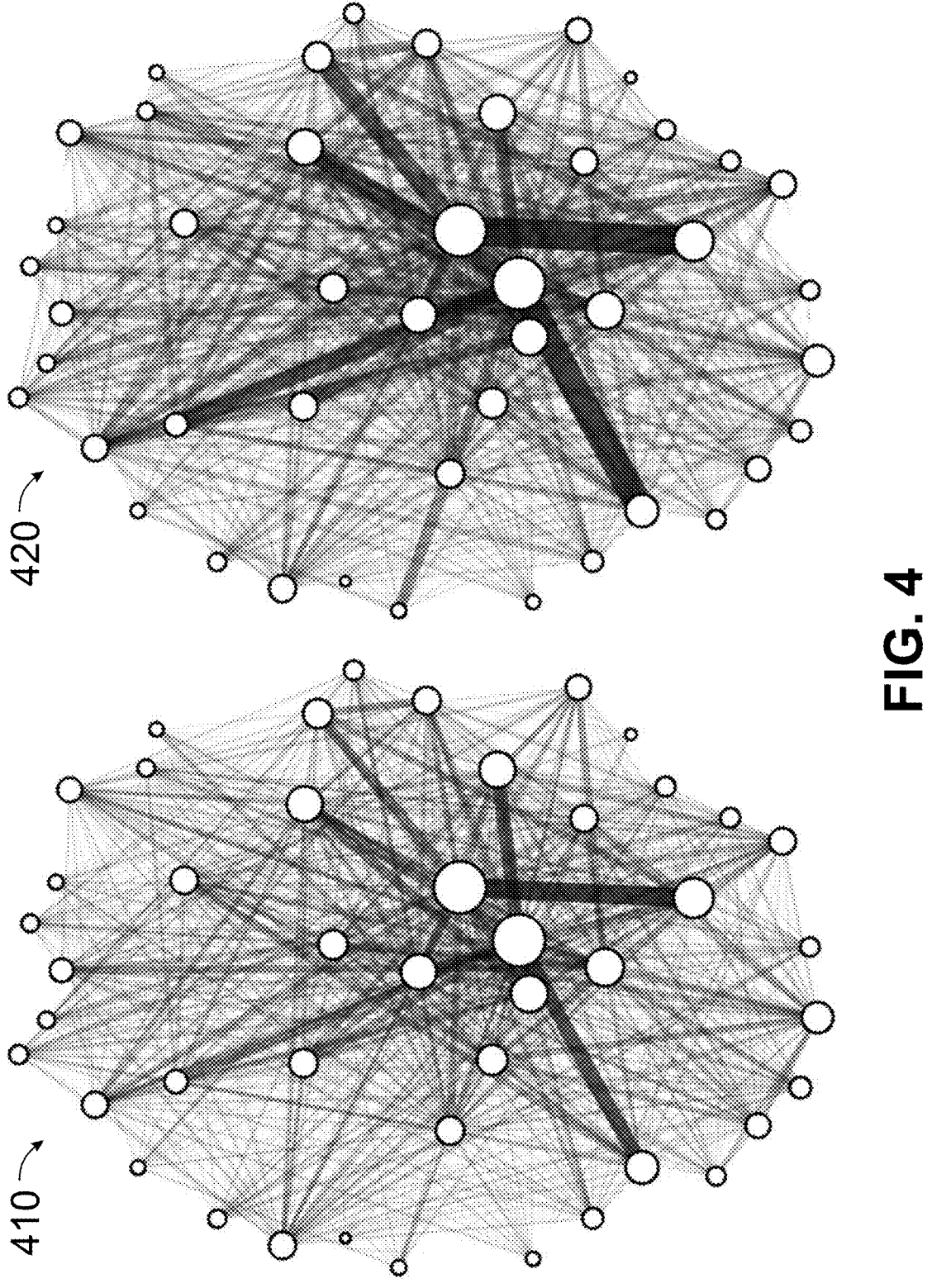
FIG. 4 depicts an example of a communication knowl-edge network with and without utilizing network-driven recommendations that optimize the information flow.

FIG. 4 depicts an example of a communication knowledge network with and without utilizing network-driven recommendations that optimize the information flow. The example communication knowledge network graph 410 displays a communication knowledge network that represents cross-team post communications in an organization before recommendations that optimize cross-team information flow have been made. The communication knowledge network graph 420 displays estimated communications in the same organization after recommendations that optimize information flow have been made. As depicted, the communication knowledge network graph 420 communication knowledge network includes stronger edges (illustrated with thicker lines) as well as an overall denser knowledge network, which includes more communications across the teams in the organization.

FIG. 5 is a flow diagram depicting an exemplary method 500 for optimizing cross-team information flow in an organization. One or more steps of method 500 may be performed by a recommendation system such as the recommendation system 142 of FIGS. 1-2. Method 500 may begin, at 502, and proceed to receive a plurality of candidate post items for displaying to a first user, at 504. This may occur in real time. For example, anytime a new post is published by a second user, when the post is accessible for viewing by the first user, a plurality of candidate post items that the first user has not viewed yet may be transmitted to the recommendation system for ranking. The first user and the second user are users of the same organization and the candidate post items are items of information posted via a communication application of the organization for access by a subset of users of the organization. The recommendation system may also receive or have access to communication events transmitted via a plurality of communication applications in the organization. The communication events may include post items but are not limited to post items and may include a variety of other types of communications, such as emails, messages, file sharing and the like.

Once the candidate post items are received, method 500 proceeds to generate a communication knowledge network graph for the organization based on the communication events in the organization, at 506. This may involve creating a knowledge graph in which each node represents a sender or a receiver, and each edge (e.g., line connecting two nodes) represents a communication events originating from the sender and being received by the receiver. The communication knowledge network graph includes timing information for each communication event. This means that each communication event in the graph is associated with a departure time, which is the time at which the communication event was send by the sender and an arrival time, which is the time at which the communication event was received by or viewed by the receiver.

In some implementations, once the communication network graph is generated, the communication network graph is modified to create a cross-team communication knowledge network graph. This is achieved by dividing users of the organization into teams. The teams may be predetermined and information about the teams may be transmitted to the recommendation system or the teams may be identified by examining communication patterns. Once the teams are identified, users of each team are represented by one node in the cross-team communication knowledge network graph. All communication events between users of different teams are represented using edges that identify the sending team and the receiving team, while communication events between users of the same teams are removed from the graph.

After the communication knowledge network graph is generated or is accessed, if it has already been generated, method 500 proceeds to estimate a total information metric value for the graph for each of the candidate post items, at 508. The estimated total information value estimates the value of the total information metric for the graph if the candidate post item is displayed to the first user. In other words, method 500 estimates how the total information metric value for the graph would change if each of the candidate post items are displayed to the first user. Separately, method 500 estimates a latency metric value for the graph for each of the candidate post items, at 510. This measurement estimates how the latency metric value of the graph would change if each of the candidate post items are displayed to the user.

Method 500 may also measure a relevance metric for each of the candidate post items, at 512. The relevance metric measures relevance of the candidate post items to the first user and may be measured by known mechanisms of measuring relevance of information to a user. This may involve use of artificial intelligence and/or trained machine learning models. A weighted combination of the total information metric value, the latency value and the relevancy metric value may then be determined. Method 500 then proceeds to rank the candidate post items based on the weighted combination of the measured metrics, at 514.

Based on the ranking, a recommendation output is generated and transmitted to the communication application via which post items are published for displaying a recommendation to the user, at 516. The recommendation data may be used by the communication application to sort the candidate post items according to the ranking. Alternatively and/or additionally, the recommendation data may be used to provide notifications to the user of top ranked post items. The notifications may be provided by the communication application or other applications. In some implementations, one or two top ranked candidate post items are transmitted for recommendation to the user, at this stage. Once the recommendation data is transmitted, method 500 ends, at 518. The process of method 500 may occur anytime a new post is published or periodically based on a predetermine schedule for each user, each channel of the communication application or other criteria.

Figure 6:
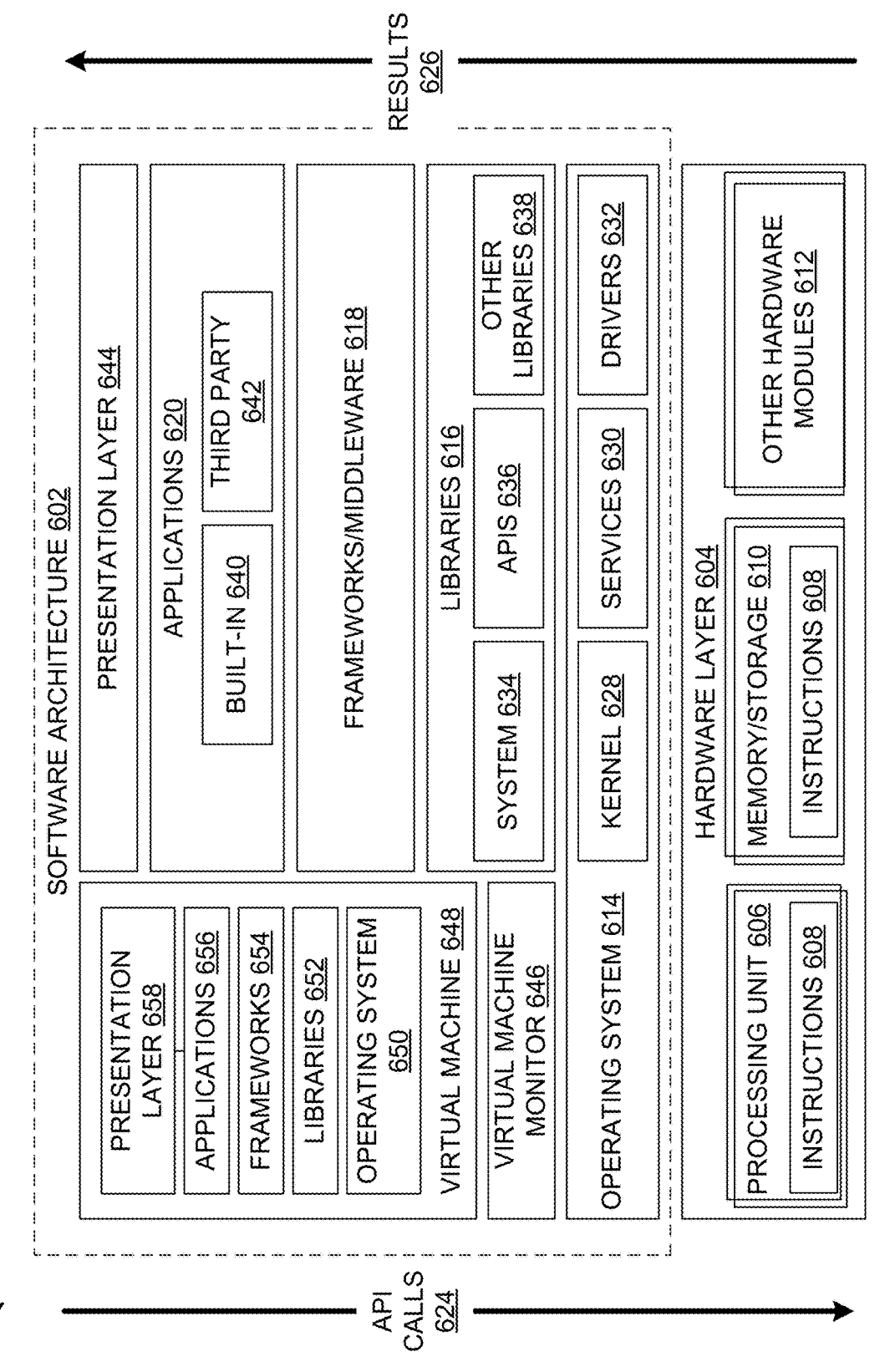
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
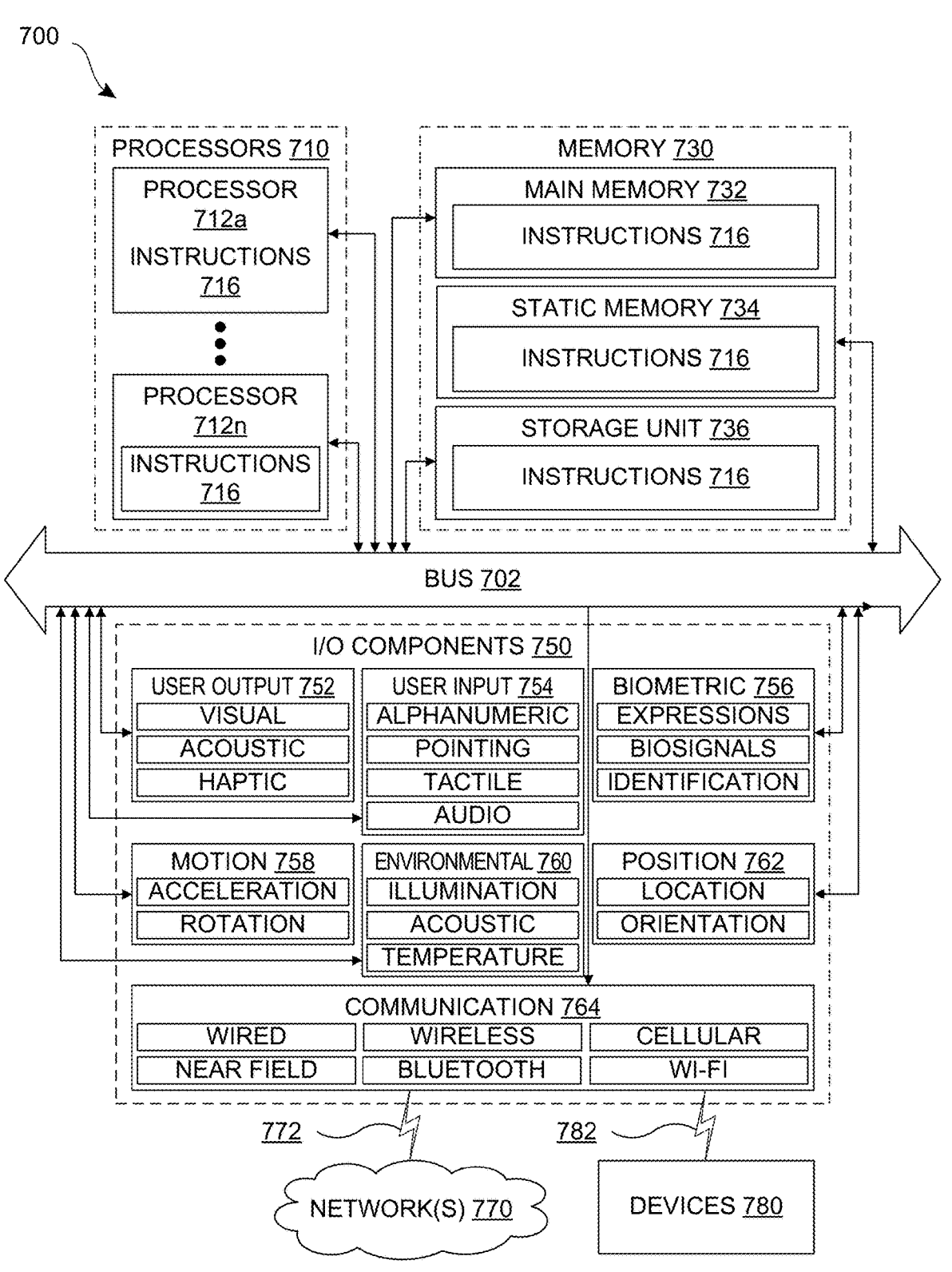
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:

a processor;

a network interface for communicating with a plurality of client devices; and a memory in communication with the processor, the memory comprising executable instructions that, when executed by the processor, cause the data processing system to perform functions of:

receiving, from a communication application, via a network, a plurality of candidate post items for display to a first user of an organization, each candidate post item being a post item published by a second user of the organization and being a post available for viewing by the first user;

accessing a communication knowledge network graph which represents communication events that have occurred between users of the organization, each communication event having a sender and a receiver;

measuring, using a latency measuring unit, an information latency metric that accounts for an age of information in the communication knowledge network graph;

measuring, using a total information measuring unit, a total information metric for the communication knowledge network graph;

estimating, using a recommendation engine, changes in at least one of the information latency metric or the total information metric if one of the candidate post items is recommended for viewing to the first user;

determining, based on the changes, that the one of the candidate post items should be recommended to the first user for viewing to optimize information flow between the users of the organization; and transmitting recommendation data to the communication application, via the network, for recommending the one of the candidate post items to the user for viewing.

Item 2. The data processing system of item 1, wherein the memory further comprises executable instructions that, when executed by the processor, cause the data processing system to generate the communication knowledge network from the communication events in the organization.

Item 3. The data processing system of any of items 1 or 2, wherein the memory further comprises executable instructions that, when executed by the processor, cause the data processing system to generate a cross-team communication knowledge network from the communication knowledge network, the cross-team communication knowledge network representing communication events between teams in the organization.

Item 4. The data processing system of item 3, wherein generating the cross-team communication knowledge network includes:

determining that a plurality of nodes in the communication knowledge network represent users belonging to one team in the organization;

upon determining that the plurality of nodes represents users belonging to the one team, collapsing the plurality of nodes into one node that represents the one team;

representing communication events between users belonging to the one team and users belonging to a second team as connecting lines between collapsed nodes that represent the one team and the second team; and removing connecting lines that represent communication events between users that belong to the one team.

Item 5. The data processing system of item 1, wherein the information latency metric measures a latency of the communication knowledge network by measuring a sum of all pairwise latencies between nodes of the communication knowledge network.

Item 6. The data processing system of item 5, wherein a pairwise latency between a first node and a second node of the communication knowledge network measures a shortest amount of time between a departure time of a path in the communication knowledge network leaving the first node and arriving at the second node.

Item 7. The data processing system of any preceding item, wherein the total information metric for a pair of nodes of the communication knowledge network is a sum of information a first node of the pair of nodes already had about a second node and an amount of information contained in each new edge between the first node and the second node.

Item 8. The data processing system of any preceding item, wherein the total information metric for the communication knowledge network is a sum of the total information metric for each pair of nodes of the communication knowledge network.

Item 9. A method for optimizing cross-team information flow in a communication network comprising:

receiving, from a communication application, via a network, a plurality of candidate post items for display to a first user of an organization, each candidate post item being a post item published by another user of the organization and being a post that is accessible to the first user;

generating, via a knowledge network generating engine, a communication knowledge network graph which represents communication events that have occurred between users of the organization, each communication event being represented by a first node that represents a sender of the communication event, a second node that represents a receiver of the communication event and an edge that represents the communication event from the sender to the receiver;

for each one of the plurality of candidate post items, estimating, using a total information measuring unit, a value of a total information metric for the communication knowledge network if one of the plurality of candidate post items is viewed by the first user;

ranking the plurality of candidate post items based on the estimated total information metric for each of the plurality of candidate post items; and transmitting recommendation data to the communication application, via the network, for recommending the plurality of candidate post items to the user based on the ranking.

Item 10. The method of item 9, further comprising:

for each one of the plurality of candidate post items, estimating, using a latency measuring unit, an information latency metric of the communication knowledge network graph if one of the plurality of candidate post items is viewed by the first user; and ranking the plurality of candidate post items based on the estimated total information metric for each of the plurality of candidate post items and the estimated information latency metric for each of the plurality of candidate post items.

Item 11. The method of item 10, further comprising ranking the plurality of candidate post items based on the estimated total information metric for each of the plurality of candidate post items, the estimated information latency metric for each of the plurality of candidate post items, and a relevancy metric that measure relevance of each of the plurality of candidate post items to the first user.

Item 12. The method of item 11, wherein a weighted combination of the estimated total information metric for each of the plurality of candidate post items, the estimated information latency metric for each of the plurality of candidate post items, and the relevancy metric for each of the plurality of candidate post items is used to rank the plurality of candidate post items.

Item 13. The method of any of items 9-12, further comprising generating a cross-team communication knowledge network from the communication knowledge network, the cross-team communication knowledge network representing communication events between teams in the organization.

Item 14. The method of item 13, wherein generating the cross-team communication knowledge network includes:

determining that a plurality of nodes in the communication knowledge network represent users belonging to one team in the organization;

upon determining that the plurality of nodes represents users belonging to the one team, collapsing the plurality of nodes into one node that represents the one team;

representing communication events between users belonging to the one team and users belonging to a second team as connecting lines between collapsed nodes that represent the one team and the second team; and removing connecting lines that represent communication events between users that belong to the one team.

Item 15. The method of item 14, wherein the total information metric for a pair of nodes of the communication knowledge network is a sum of information a first node of the pair of nodes already had about the second node and an amount of information contained in each new edge between the first node and the second node, the first node representing the one team and the second node representing the second team.

Item 16. The method of item 15, wherein ranking the plurality of candidate post items based on the estimated total information metric for each of the plurality of candidate post items and the estimated information latency metric for each of the plurality of candidate post items optimizes cross-team information flow.

Item 17. A non-transitory computer readable medium on which are stored instructions that, when executed, cause a programmable device to perform functions of:

receiving, from a communication application, via a network, a plurality of candidate post items for display to a first user of an organization, each candidate post item being a post item published by another user of the organization and being a post that is accessible to the first user, the organization having a plurality of teams and the first user belonging to a first team of the plurality of teams and the other user belonging to a second team of the plurality of teams;

generating, via a knowledge network generating engine, a communication knowledge network graph which represents communication events that have occurred between the plurality of the teams, each communication event being represented by a first node that represents a sending team of the communication event, a second node that represents a receiving team of the communication event and an edge that represents the communication event from the sending team to the receiving team;

for each one of the plurality of candidate post items, estimating, using a total information measuring unit, a value for a total information metric for the communication knowledge network if one of the plurality of candidate post items is viewed by the first user;

ranking the plurality of candidate post items based on the estimated total information metric for each of the plurality of candidate post items to optimize cross-team information flow in the organization; and transmitting recommendation data to the communication application, via the network, for recommending the plurality of candidate post items to the user based on the ranking.

Item 18. The non-transitory computer readable medium of item 17, wherein the instructions, when executed, further cause the programmable device to perform functions of:

for each one of the plurality of candidate post items, estimating, using a latency measuring unit, an information latency metric of the communication knowledge network graph if one of the plurality of candidate post items is viewed by the first user; and ranking the plurality of candidate post items based on the estimated total information metric for each of the plurality of candidate post items and the estimated information latency metric for each of the plurality of candidate post items.

Item 19. The non-transitory computer readable medium of item 18, wherein the instructions, when executed, further cause the programmable device to perform functions of ranking the plurality of candidate post items based on the estimated total information metric for each of the plurality of candidate post items, the estimated information latency metric for each of the plurality of candidate post items, and a relevancy metric that measure relevance of each of the plurality of candidate post items to the first user.

Item 20. The non-transitory computer readable medium of item 19, wherein a weighted combination of the estimated total information metric for each of the plurality of candidate post items, the estimated information latency metric for each of the plurality of candidate post items, and the relevancy metric for each of the plurality of candidate post items is used to rank the plurality of candidate post items.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor;
   a network interface for communicating with a plurality of client devices; and a memory in communication with the processor, the memory comprising executable instructions that, when executed by the processor, cause the data processing system to perform functions of:

receiving, from a communication application, via a network, a plurality of candidate post items for display to a first user of an organization, each candidate post item being a post item published by a second user of the organization and being a post available for viewing by the first user;

generating, in real-time, a temporal communication knowledge network graph which represents communication events that have occurred between users of the organization, each communication event having a sender, a receiver, a departure time, and an arrival time, the graph being continuously updated as new communication events occur, wherein the candidate post items are messages that are shared with and are available for viewing to a group of two or more users of the organization that are a subset of the users of the organization;

measuring, using a latency measuring unit executing in the data processing system, an information latency metric that accounts for an age of the most recent information in the temporal communication knowledge network graph, the measuring including computing pairwise latencies using a priority queue algorithm configured to determine minimum age knowledge between nodes;

measuring a total information metric for the temporal communication knowledge network graph, the measuring including applying an exponential decay function to model degradation of information along paths and edge weights corresponding to different communication modalities;

estimating changes in at least one of the information latency metric or the total information metric if one of the candidate post items is recommended for viewing to the first user;

determining, based on the estimated changes, that the one of the candidate post items should be recommended to the first user for viewing to optimize cross-team information flow between the users of in the organization and to reduce system communication latency; and transmitting recommendation data to the communication application, via the network, for recommending the one of the candidate post items to the user for viewing, the recommendation data usable by the communication application to sort the candidate post items according to a ranking of the candidate post items based on a weighted combination of at least the information latency metric and total information metric, wherein the temporal communication knowledge network graph and the recommendation are updated in real-time as new candidate post items are received.

2. The data processing system of claim 1, wherein the memory further comprises executable instructions that, when executed by the processor, cause the data processing system to generate a cross-team communication knowledge network from the communication knowledge network, the cross-team communication knowledge network representing communication events between teams in the organization.

3. The data processing system of claim 2, wherein generating the cross-team communication knowledge network includes:

determining that a plurality of nodes in the communication knowledge network represent users belonging to one team in the organization;

upon determining that the plurality of nodes represents users belonging to the one team, collapsing the plurality of nodes into one node that represents the one team;

representing communication events between users belonging to the one team and users belonging to a second team as connecting lines between collapsed nodes that represent the one team and the second team; and removing connecting lines that represent communication events between users that belong to the one team.

4. The data processing system of claim 1, wherein the information latency metric measures a latency of the communication knowledge network by measuring a sum of all pairwise latencies between nodes of the communication knowledge network.

5. The data processing system of claim 4, wherein a pairwise latency between a first node and a second node of the communication knowledge network measures a shortest amount of time between a departure time of a path in the communication knowledge network leaving the first node and arriving at the second node.

6. The data processing system of claim 1, wherein the total information metric for a pair of nodes of the communication knowledge network is a sum of information a first node of the pair of nodes already had about a second node and an amount of information contained in each new edge between the first node and the second node.

7. The data processing system of claim 1, wherein the total information metric for the communication knowledge network is a sum of the total information metric for each pair of nodes of the communication knowledge network.

8. A method for optimizing cross-team information flow in a communication network comprising:

receiving, from a communication application, via a network, a plurality of candidate post items for display to a first user of an organization, each candidate post item being a post item published by another user of the organization and being a post that is accessible to the first user;

generating, in real-time, via a knowledge network generating engine, a temporal communication knowledge network graph which represents communication events that have occurred between users of the organization, each communication event being represented by a first node that represents a sender of the communication event, a second node that represents a receiver of the communication event and an edge that represents the communication event from the sender to the receiver, a departure time, and an arrival time, the graph being continuously updated as new communication events occur, wherein the candidate post items are messages that are shared with and are available for viewing to a group of two or more users of the organization that are a subset of the users of the organization;

for each one of the plurality of candidate post items, estimating a value of a total information metric for the temporal communication knowledge network if one of the plurality of candidate post items is viewed by the first user, wherein the total information metric accounts for degradation of information along long paths and amount of communication by applying an exponential decay function to model the degradation;

ranking the plurality of candidate post items based on the estimated total information metric for each of the plurality of candidate post items; and transmitting recommendation data to the communication application, via the network, for recommending the plurality of candidate post items to the user based on the ranking, the recommendation data usable by the communication application to sort the candidate post items according to ranking based on a weighted combination of at least an information latency metric and the total information metric, wherein the temporal communication knowledge network and the recommendation are updated in real-time as new candidate post items are received.

9. The method of claim 8, further comprising:

for each one of the plurality of candidate post items, estimating, using a latency measuring unit, an information latency metric of the communication knowledge network graph if one of the plurality of candidate post items is viewed by the first user; and ranking the plurality of candidate post items based on the estimated total information metric for each of the plurality of candidate post items and the estimated information latency metric for each of the plurality of candidate post items.

10. The method of claim 9, further comprising ranking the plurality of candidate post items based on the estimated total information metric for each of the plurality of candidate post items, the estimated information latency metric for each of the plurality of candidate post items, and a relevancy metric that measure relevance of each of the plurality of candidate post items to the first user.

11. The method of claim 10, wherein a weighted combination of the estimated total information metric for each of the plurality of candidate post items, the estimated information latency metric for each of the plurality of candidate post items, and the relevancy metric for each of the plurality of candidate post items is used to rank the plurality of candidate post items.

12. The method of claim 8, further comprising generating a cross-team communication knowledge network from the communication knowledge network, the cross-team communication knowledge network representing communication events between teams in the organization.

13. The method of claim 12, wherein generating the cross-team communication knowledge network includes:

determining that a plurality of nodes in the communication knowledge network represent users belonging to one team in the organization;

upon determining that the plurality of nodes represents users belonging to the one team, collapsing the plurality of nodes into one node that represents the one team;

representing communication events between users belonging to the one team and users belonging to a second team as connecting lines between collapsed nodes that represent the one team and the second team; and removing connecting lines that represent communication events between users that belong to the one team.

14. The method of claim 13, wherein the total information metric for a pair of nodes of the communication knowledge network is a sum of information a first node of the pair of nodes already had about the second node and an amount of information contained in each new edge between the first node and the second node, the first node representing the one team and the second node representing the second team.

15. The method of claim 14, wherein ranking the plurality of candidate post items based on the estimated total information metric for each of the plurality of candidate post items and an estimated information latency metric for each of the plurality of candidate post items optimizes cross-team information flow.

16. A non-transitory computer readable medium on which are stored instructions that, when executed, cause a programmable device to perform functions of:

receiving, from a communication application, via a network, a plurality of candidate post items for display to a first user of an organization, each candidate post item being a post item published by another user of the organization and being a post that is accessible to the first user, the organization having a plurality of teams and the first user belonging to a first team of the plurality of teams and the other user belonging to a second team of the plurality of teams;

generating, in real-time, via a knowledge network generating engine, a temporal communication knowledge network graph which represents communication events that have occurred between the plurality of the teams, each communication event being represented by a first node that represents a sending team of the communication event, a second node that represents a receiving team of the communication event and an edge that represents the communication event from the sending team to the receiving team, a departure time, and an arrival time, the graph being continuously updated as new communication events occur, wherein the candidate post items are messages that are shared with and are available for viewing to a group of two or more users of the organization that are a subset of the users of the organization;

for each one of the plurality of candidate post items, estimating a value for a total information metric for the communication knowledge network if one of the plurality of candidate post items is viewed by the first user, wherein the total information metric accounts for degradation of information along long paths and amount of communication by applying an exponential decay function to model the degradation;

ranking the plurality of candidate post items based on the estimated total information metric for each of the plurality of candidate post items to optimize cross-team information flow in the organization; and transmitting recommendation data to the communication application, via the network, for recommending the plurality of candidate post items to the user based on the ranking, the recommendation data usable by the communication application to sort the candidate post items according to ranking based on a weighted combination of at least an information latency metric and the total information metric, wherein the temporal communication knowledge network and the recommendation are updated in real-time as new candidate post items are received.

17. The non-transitory computer readable medium of claim 16, wherein the instructions, when executed, further cause the programmable device to perform functions of:

for each one of the plurality of candidate post items, estimating, using a latency measuring unit, an information latency metric of the communication knowledge network graph if one of the plurality of candidate post items is viewed by the first user; and ranking the plurality of candidate post items based on the estimated total information metric for each of the plurality of candidate post items and the estimated information latency metric for each of the plurality of candidate post items.

18. The non-transitory computer readable medium of claim 17, wherein the instructions, when executed, further cause the programmable device to perform functions of ranking the plurality of candidate post items based on the estimated total information metric for each of the plurality of candidate post items, the estimated information latency metric for each of the plurality of candidate post items, and a relevancy metric that measure relevance of each of the plurality of candidate post items to the first user.

19. The non-transitory computer readable medium of claim 18, wherein a weighted combination of the estimated total information metric for each of the plurality of candidate post items, the estimated information latency metric for each of the plurality of candidate post items, and the relevancy metric for each of the plurality of candidate post items is used to rank the plurality of candidate post items.

\* \* \* \* \*